United States Patent
Emmert et al.

(10) Patent No.: US 6,549,962 B1
(45) Date of Patent: Apr. 15, 2003

(54) DEMONSTRATION PAGE METHOD AND APPARATUS

(75) Inventors: James R. Emmert, Boise, ID (US); Nanette C. Jensen, Meridian, ID (US); Mark D. Montierth, Meridian, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/469,746

(22) Filed: Dec. 21, 1999

(51) Int. Cl.$^7$ .......................... G06F 13/10; G06F 13/20; G06F 12/02
(52) U.S. Cl. .................. 710/65; 710/3; 710/5; 710/6; 710/74
(58) Field of Search .............................. 710/3, 5, 6, 65, 710/74

(56) References Cited

U.S. PATENT DOCUMENTS

| | | | | |
|---|---|---|---|---|
| 5,513,305 A | * | 4/1996 | Maghbouleh | 345/781 |
| 5,553,281 A | * | 9/1996 | Brown et al. | 345/619 |
| 6,042,278 A | * | 3/2000 | Spencer et al. | 400/61 |
| 6,271,840 B1 | * | 8/2001 | Finseth et al. | 707/513 |

* cited by examiner

*Primary Examiner*—Jeffrey Gaffin
*Assistant Examiner*—Rehana Perveen

(57) ABSTRACT

A demonstration page system in an apparatus including a recycling internal memory device is provided. Demonstration page information is stored in the recycling internal memory device. An output device is provided to output a demonstration page. A user interface is also provided. The user interface is adapted and constructed to selectively retrieve demonstration page information from the recycling internal memory device and send the demonstration page information to the output device to be output. The recycling internal memory device can be provided as non-volatile RAM, such as Flash memory. When the apparatus is a multi-function peripheral including fax capabilities, the demonstration page information can be stored in fax storage memory. An overwrite mechanism can be provided to write over the demonstration page info stored in the recycling internal memory device when the multi-function peripheral receives its first fax. The overwrite mechanism can be embedded in firmware associated with the apparatus. The demonstration page information can encompass information corresponding to a plurality of demonstration pages. The user interface can be provided as a firmware-based mechanism for selecting one demonstration page from the plurality of demonstration pages based upon pre-programmed criteria, e.g., demonstration page text language. A method of outputting a demonstration page from an apparatus including a recycling internal memory device is also set forth.

20 Claims, 2 Drawing Sheets

DEMONSTRATION PAGE METHOD AND APPARATUS

BACKGROUND OF THE INVENTION

In the printer and Multi-Function Peripheral (MFP) market, customers at retail stores are accustomed to being able to view sample prints in order to compare different units, or units from different manufacturers. In a typical arrangement, each unit is connected to a demonstration pod. The units are connected to the demonstration pods via suitable connections, such as an IEEE 1284 parallel port. The pod usually provides one of several demonstration pages to the unit when a customer presses a button on the pod.

It is customary for each manufacturer to provide its own demonstration pod, which means that each manufacturer supplies a pod to each retail outlet in which its products are sold. In some cases, such outlets may number in the thousands. Furthermore, since units are sold in countries throughout the world, demonstration pods, like the units themselves, must be "localized". This means that user interfaces, manuals, and the demonstration pages must be provided in the appropriate language. The costs of procuring, maintaining, and placing demonstration pods increases the cost of doing business in each locale.

Yet another disadvantage of demonstration pods is that they must be reset relatively frequently in order to function properly. It is common for communication between the unit and the pod to become "hung", i.e., to go into an unknown state. When this happens, the demonstration pod simply ceases to function, thus preventing printing of the demonstration page. Unfortunately, the customer may assume that the unit, rather than the demonstration pod, is malfunctioning. This assumption potentially results in lost sales to the manufacturer.

One alternative to demonstration pods is the use of a demonstration memory module that plugs into a memory expansion location on the unit. Although the cost of providing a memory module associated with each demonstration unit is relatively high, the risk of central pod failure is eliminated. However, as with the demonstration pod systems, demonstration memory modules must be localized. Consequently, demonstration modules do not mitigate the costs of doing business in each locale that accompany localization.

It can thus be seen that the need exists for a method and apparatus that can reliably and inexpensively provide demonstration pages while reducing costs associated with localization.

SUMMARY OF THE INVENTION

These and other objects are achieved by providing a demonstration page system in an apparatus including a recycling internal memory device. Demonstration page information is stored in the recycling internal memory device. An output device is provided to output a demonstration page. A user interface is also provided. The user interface is adapted and constructed to selectively retrieve demonstration page information from the recycling internal memory device and send the demonstration page information to the output device to be output.

The recycling internal memory device can be provided as non-volatile RAM, such as Flash memory. When the apparatus is a multi-function peripheral including fax capabilities, the demonstration page information can be stored in fax storage memory. An overwrite mechanism can be provided to write over the demonstration page info stored in the recycling internal memory device when the multi-function peripheral receives its first fax. The overwrite mechanism can be embedded in firmware associated with the apparatus.

The demonstration page information can encompass information corresponding to a plurality of demonstration pages. The user interface can be provided as a firmware-based mechanism for selecting one demonstration page from the plurality of demonstration pages based upon pre-programmed criteria, e.g., demonstration page text language.

A method of outputting a demonstration page from an apparatus including a recycling internal memory device is also set forth. In a first step, demonstration page information is stored in the recycling internal memory device. An output device adapted and constructed to output a demonstration page is provided, as is a user interface. The user interface is adapted and constructed to selectively retrieve demonstration page information from the recycling internal memory device, and to send the demonstration page information to the output device to be output. Next, the user interface is actuated to retrieve demonstration page information from the recycling internal memory device and to send the demonstration page information to the output device to be output.

The features of the invention believed to be patentable are set forth with particularity in the appended claims. The invention itself, however, both as to organization and method of operation, together with further objects and advantages thereof, may be best understood by reference to the following description taken in conjunction with the accompanying drawings.

DETAILED DESCRIPTION OF THE INVENTION

Figure 1:
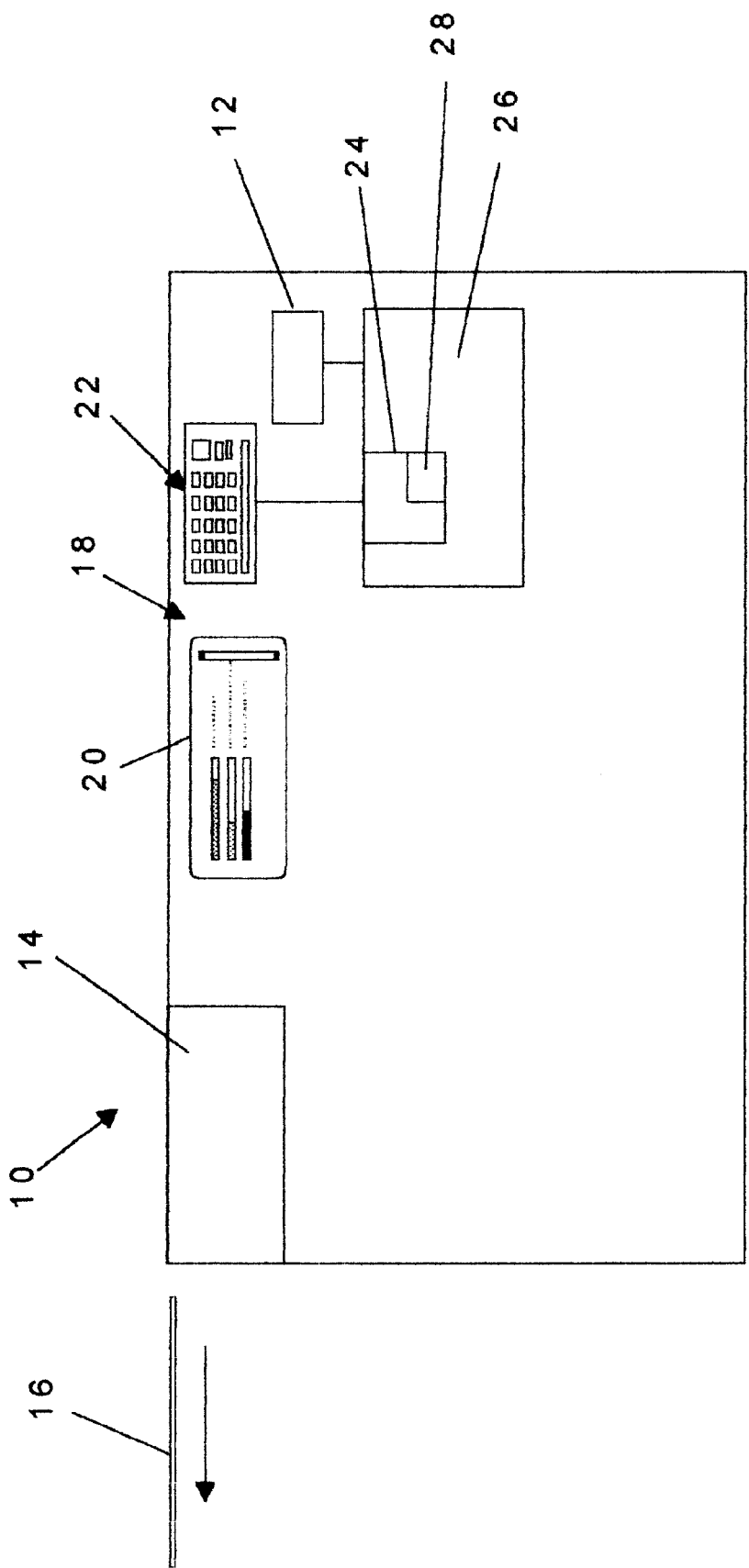
FIG. 1 is a schematic illustration of a demonstration page system in an apparatus including a recycling internal memory device in accordance with the principles of the present invention.

An apparatus 10 including a recycling internal memory device 12 is illustrated in FIG. 1. The apparatus 10 can be provided as any apparatus with which it may be desirable to produce a demonstration page to provide a potential customer with an example of actual apparatus output. Such apparatus can include, but are not limited to, a printer, copier, fax machine, or multi-function peripheral. One example of such an apparatus is the HP LASERJET 3100 by Hewlett-Packard Company.

The recycling internal memory device 12 contains pre-programmed information which is subsequently replaced during normal operation of the apparatus 10. The recycling internal memory device 12 may be provided as non-volatile RAM, such as Flash memory. In those instances where the apparatus 10 is an MFP having fax capabilities, internal fax memory can be used as the internal memory device 12.

Demonstration page information is stored in the internal memory device 12. An output device 14, such as a laser or ink jet printing mechanism, is provided to output a demonstration page 16. A user interface 18 includes a display 20 and control panel 22 connected to firmware 24 within a control system 26 of the apparatus 10. The user interface 18 is adapted and constructed to selectively retrieve demonstration page information from the internal memory device 12 and send the demonstration page information to the output device 14 to be output.

The firmware 24 can also be provided with an overwrite mechanism 28. The overwrite mechanism 28 instructs the control system 24 to write over the demonstration page information stored in the internal memory device 12 when the multi-function peripheral receives its first fax.

Figure 2:
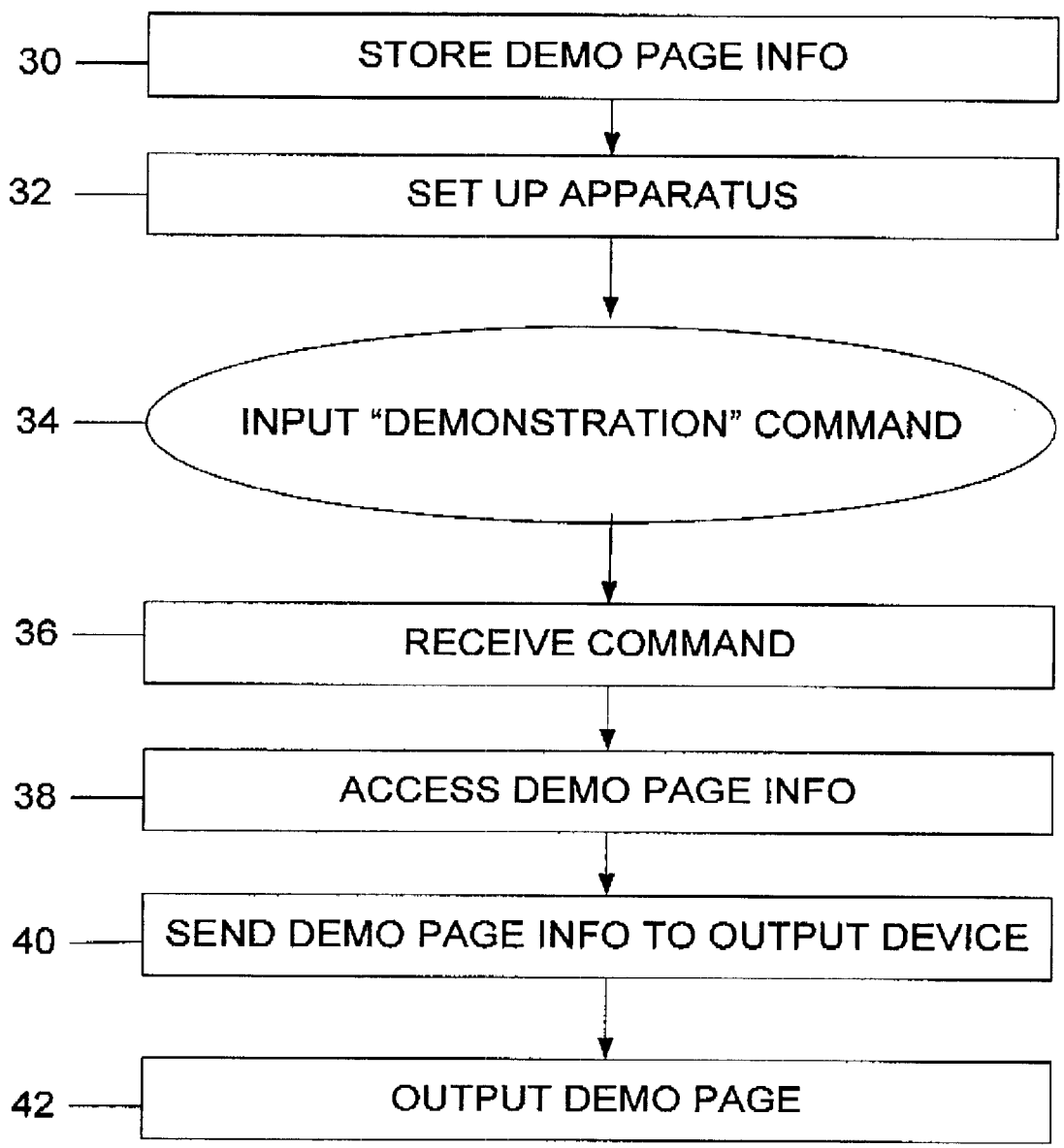
FIG. 2 is a flow chart illustrating a method of outputting a demonstration page from an apparatus including a recycling internal memory device in accordance with the principles of the present invention.

A flow chart illustrating a method of outputting a demonstration page in accordance with the principles of the present invention is shown in FIG. 2. The method is described in the context of an apparatus similar to that set forth in FIG. 1. In a first step 30, demonstration page information is stored in the internal memory device. The step of storing demonstration page information can be accomplished in any suitable manner. Next, the apparatus is set up at point 32. During this step, the default settings for parameters such as language, page size, etc. are chosen, after which the apparatus is ready for operation as a demo unit.

At step 34, a potential buyer enters a command to output a demonstration page via the user interface. The control system receives the command at point 36, and retrieves demonstration page information from the internal memory device at point 38. The user interface is actuated to retrieve demonstration page information from the internal memory device at point 40, and is sent to the output device to be output.

It is contemplated that those of skill in the art will recognize that the present invention as described can be practiced in a variety of ways. For example, in an apparatus such as an MFP, fax storage memory can be used for storing demonstration page images. All MFP's that provide fax capabilities generally provide temporary storage of incoming fax pages so that, if the machine is out of paper, the incoming fax is not immediately lost.

A typical line art and text demonstration page requires 100 KB of memory if stored in the PCL format. More complicated demonstration pages may take 740 KB of memory. The demonstration page information can encompass information corresponding to a plurality of demonstration pages, e.g., multiple versions of text may be associated with each demonstration page to facilitate different languages. For most languages, this would only marginally increase the amount of memory required for a given page. These different text versions will be used by the firmware to change languages for the demonstration pages. The user interface can be provided as a firmware-based mechanism for selecting one demonstration page from the plurality of demonstration pages based upon pre-programmed criteria, e.g., demonstration page text language. Compression may also be used by the firmware to further increase the number of pages capable of being stored in the flash memory. In any case, it is possible to store at least one or two demonstration pages in 1.5 MB of available memory.

Firmware can be written so that, until the first fax is received, the demonstration page stored in flash memory is available. The prospective buyer can access the demonstration page via a user interface, such as a control panel having a display screen. This firmware would as well recognize which language option should be used, typically when the local language is selected during setup of the apparatus.

When a user selects the demonstration page, the firmware decides which text to use to construct the page, so that text portions of the demonstration page appear in the desired language. The firmware can be written so that, once the first fax has been received, the demonstration page in flash memory will be overwritten. Test pages, which are typically stored in ROM, will still be available.

The memory device can be programmed in any of several ways, as will be apparent to those of skill in the art. For example, economical and sales advantages are provided when the memory device of each unit is pre-programmed with demonstration page information. Such pre-programming can be procured relatively inexpensively, and allows any unit to be used as a demonstration unit "out-of-the-box".

Alternatively, the memory device can be programmed by a driver running in a host, such as a PC, connected to the unit. The firmware of the apparatus will already be designed to accept fax code revisions, and can thus be altered commands to program the available fax memory to contain and output a demonstration page. In this alternative method, an apparatus to be used as a demonstration unit can be programmed by a sales representative at a retail outlet with a laptop or other host, or by in-store personnel using programs supplied by the apparatus manufacturer. Programming can be accomplished using a data set corresponding to the language appropriate for a specific geographical location (country, state or province, or city), and can even contain customized information for a particular retail outlet. This would also allow demonstration page information to be changed virtually instantaneously in response to market demands, e.g., to publicize discounts, rebates, and to promote sales of associated goods and services. Advantages of this method also include ease of localization and elimination of any special manufacturing steps.

Other alternatives, such as programming the memory on the manufacturing line, or using modem capabilities of the apparatus to call a toll-free number to download demonstration page information, are also contemplated.

The present invention significantly lowers the cost of providing demonstration pages by eliminating the need for expensive demonstration pods or extra memory cards, as required in known systems. Also eliminated are the costs associated with maintaining relationships with demonstration pod or external memory device vendors. Further, the use of internal memory is inherently more reliable than demonstration pods or external memory. Increased reliability exposes more potential customers to a fully-functioning unit, which should translate into increased sales. Yet another advantage is that changes to a specific model will not require redesigned demonstration pods or external memory devices.

Although the present invention has been described with reference to specific embodiments, those of skill in the art will recognize that changes may be made thereto without departing from the scope and spirit of the invention as defined by the appended claims.

What is claimed is:

1. In an imaging apparatus including a recycling internal memory device, a demonstration page system comprising the following:

demonstration page information stored in the recycling internal memory device;

an output device adapted and constructed to output a demonstration page containing demonstration page information; and a user interface adapted and constructed to selectively retrieve demonstration page information from the recycling internal memory device and send the demonstration page information to the output device to be output;

whereby the demonstration page information stored in the recycling internal memory device is subsequently replaced during normal operation of the apparatus.

2. A demonstration page system according to claim 1, wherein the recycling internal memory device comprises internal non-volatile RAM.

3. A demonstration page system according to claim 2, wherein the internal non-volatile RAM comprises Flash memory.

4. A demonstration page system according to claim 1, wherein the apparatus is a multi-function peripheral including fax capabilities, and the recycling internal memory device comprises fax storage memory.

5. A demonstration page system according to claim 4, further comprising an overwrite mechanism adapted and constructed to write over the demonstration page info stored in the recycling internal memory device when the multi-function peripheral receives its first fax.

6. A demonstration page system according to claim 5, wherein the overwrite mechanism is embedded in firmware.

7. A demonstration page system according to claim 1, wherein the demonstration page information comprises information corresponding to a plurality of demonstration pages.

8. A demonstration page system according to claim 7, wherein the user interface comprises a firmware-based mechanism for selecting one demonstration page from the plurality of demonstration pages based upon pre-programmed criteria.

9. A demonstration page system according to claim 8, wherein the pre-programmed criteria include demonstration page text language.

10. In an imaging apparatus including a recycling internal memory device, a method of outputting a demonstration page, the method comprising the following steps:

storing demonstration page information in the recycling internal memory device;

providing an output device adapted and constructed to output a demonstration page containing demonstration page information;

providing a user interface adapted and constructed to selectively retrieve demonstration page information from the recycling internal memory device and send the demonstration page information to the output device to be output; and actuating the user interface to retrieve demonstration page information from the recycling internal memory device and to send the demonstration page information to the output device to be output;

whereby the demonstration page information stored in the recycling internal memory device is subsequently replaced during normal operation of the apparatus.

11. A method according to claim 10, wherein the step of storing demonstration page information in the recycling internal memory device comprises storing demonstration page information in non-volatile RAM.

12. A method according to claim 11, wherein the step of storing demonstration page information in non-volatile RAM comprises storing demonstration page information in Flash memory.

13. A method according to claim 10, wherein the apparatus comprises a multi-function peripheral including fax capabilities, and the step of storing demonstration page information in the recycling internal memory device comprises storing demonstration page information in fax storage memory.

14. A method according to claim 13, further comprising the step of overwriting the demonstration page information stored in the recycling internal memory device when the multi-function peripheral receives its first fax.

15. A method according to claim 14, wherein the step of overwriting the demonstration page information comprises invoking a firmware-based overwrite routine.

16. A method according to claim 10, wherein the step of storing demonstration page information in the recycling internal memory device comprises storing information corresponding to a plurality of demonstration pages.

17. A demonstration page system according to claim 16, wherein the step of actuating the user interface to retrieve demonstration page information comprises invoking a firmware-based routine to select one demonstration page from the plurality of demonstration pages based upon pre-programmed criteria.

18. A demonstration page system according to claim 17, wherein the step of invoking a firmware-based routine to select one demonstration page from the plurality of demonstration pages based upon pre-programmed criteria comprises invoking a firmware-based routine to select one demonstration page from the plurality of demonstration pages based upon demonstration page text language.

19. In a multi-function peripheral device including a recycling internal non-volatile RAM, a demonstration page system comprising the following:

demonstration page information stored in the recycling internal non-volatile RAM;

an output device adapted and constructed to output a demonstration page containing demonstration page information; and a user interface adapted and constructed to selectively retrieve demonstration page information from the recycling internal non-volatile RAM and send the demonstration page information to the output device to be output;

whereby the demonstration page information stored in the recycling internal non-volatile RAM is subsequently replaced during normal operation of the apparatus.

20. A demonstration page system according to claim 19, wherein the multi-function peripheral includes fax capabilities, and the recycling internal non-volatile RAM comprises fax storage memory.

* * * * *